F. A. FROMMANN.
VEHICLE WHEEL.
APPLICATION FILED OCT. 15, 1914.
1,314,739.
Patented Sept. 2, 1919.
3 SHEETS—SHEET 1.
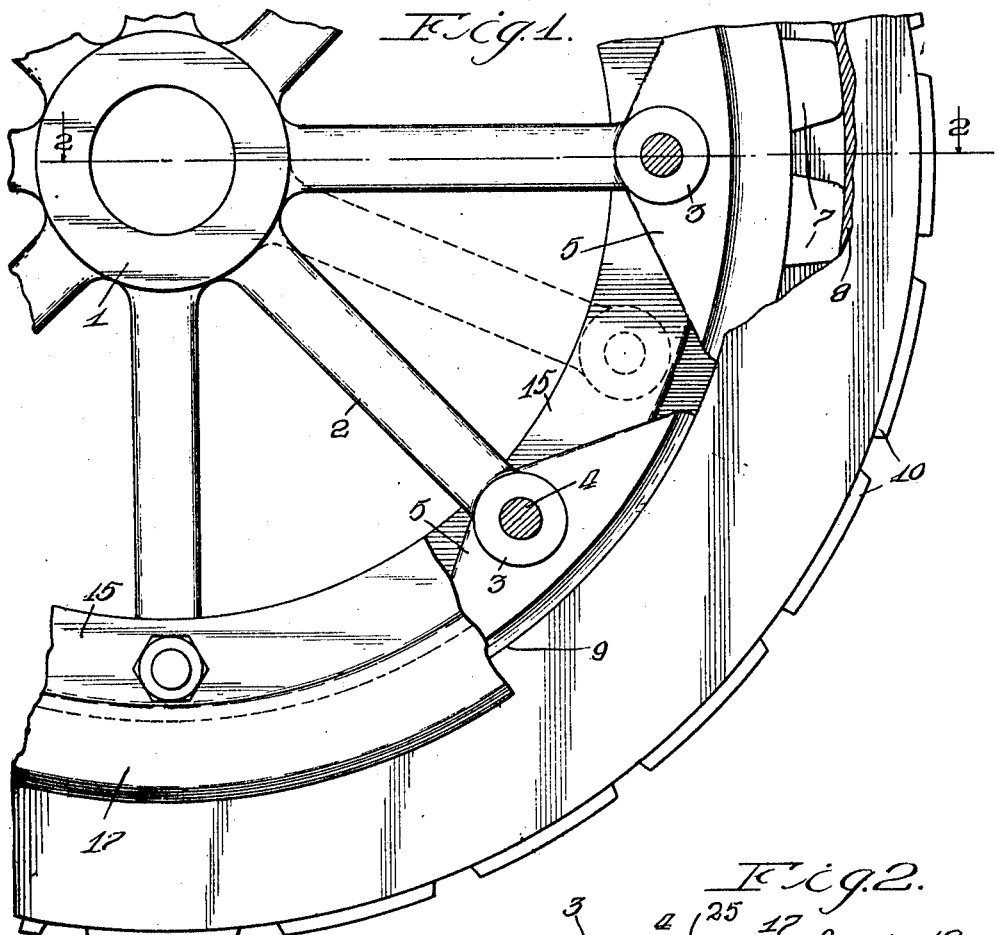
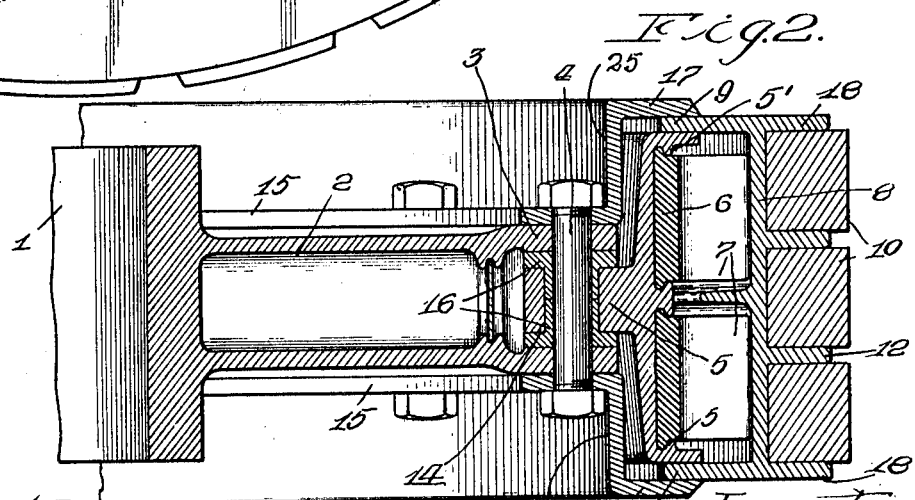

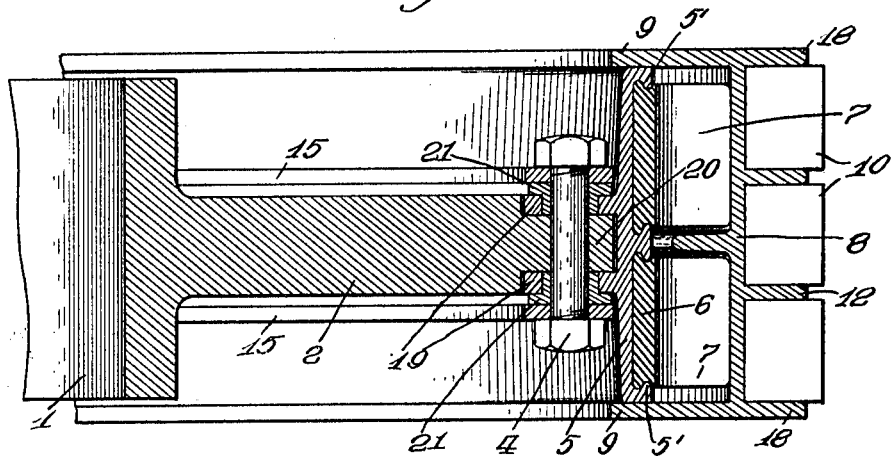
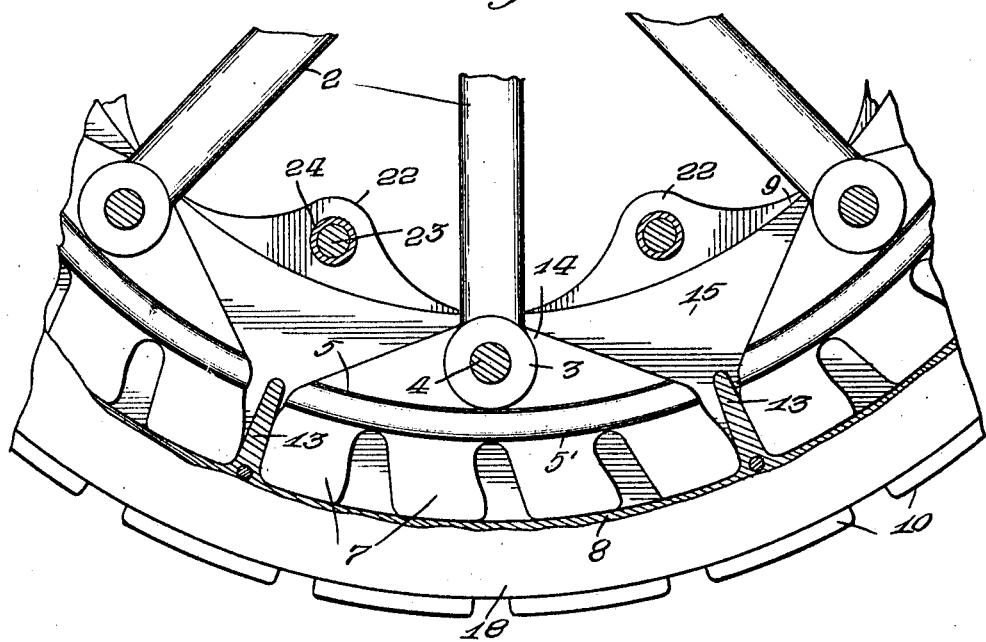

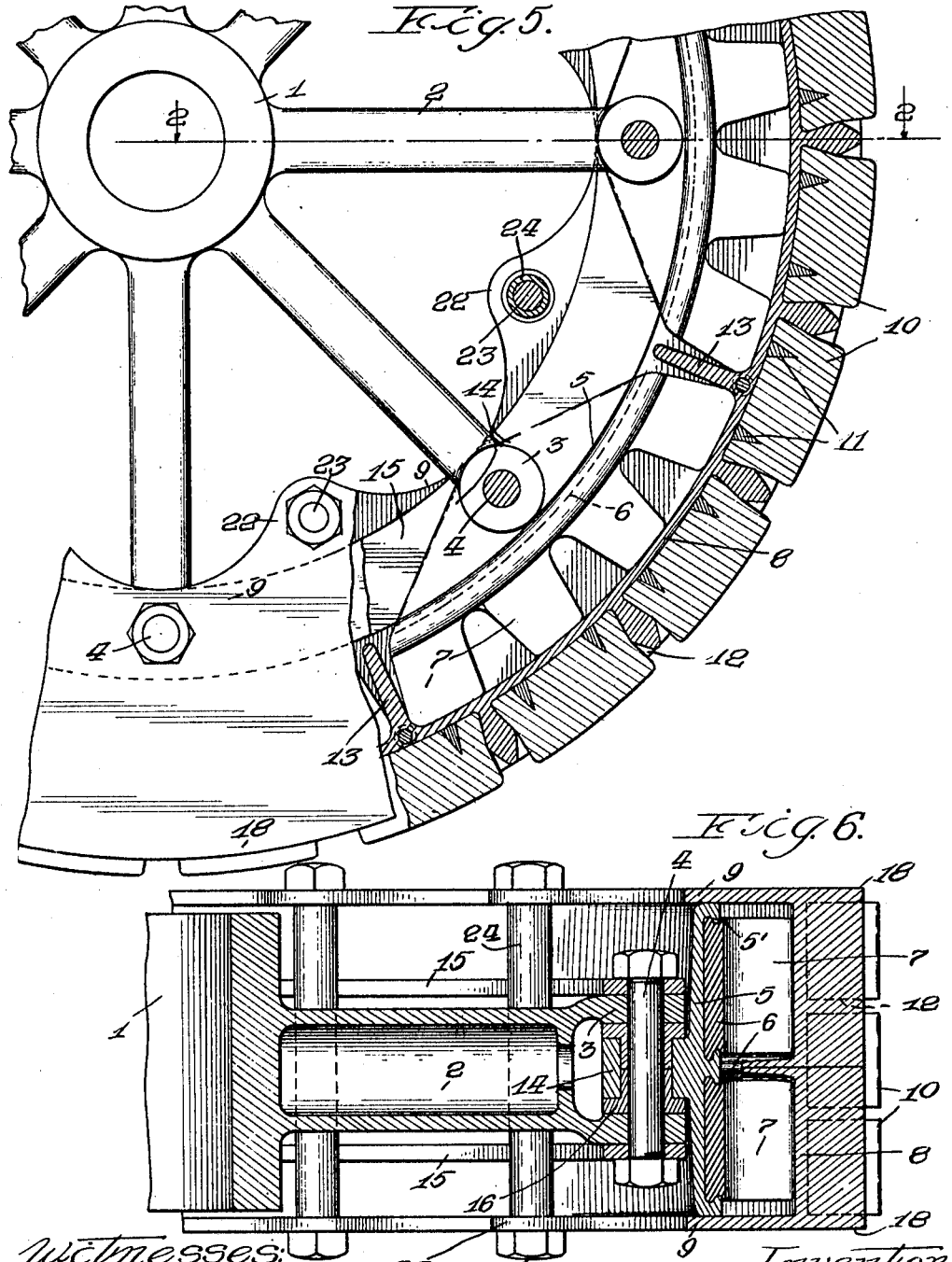

UNITED STATES PATENT OFFICE.

FRANKLIN A. FROMMANN, OF CHICAGO, ILLINOIS.

VEHICLE-WHEEL.

1,314,739. Specification of Letters Patent. Patented Sept. 2, 1919.

Application filed October 15, 1914. Serial No. 866,800.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels, and more particularly to the class of wheels having rim or tire members floatingly and resiliently mounted with respect to the hub members thereof. The prime object of my invention is to provide a simple and easily assembled wheel construction which will permit a considerable relative motion of the rim and tire members of the wheel radially with respect thereto, but which will permit only a limited relative circumferential motion of the said members. Another object is to provide a simple means for strengthening the side flanges of the rim member so as to enable them to resist lateral strains due to the pressure of the parts of the hub member housed by the same. Other objects will appear from the following specification, and from the accompanying drawings, in which:

Figure —1— is a fragmentary view, partly in section, of a wheel embodying my invention.

Fig. —2— is a horizontal section through the wheel of Fig. —1— along the line 2—2.

Fig. —3— is a similar section through an alternative embodiment of my invention.

Fig. —4— is a fragmentary view of the wheel of Fig. —1— with the hub and rim members displaced under pressure.

Figs. —5— and —6— are views, similar to Figs. —1— and —2—, but of an alternative embodiment of my invention.

In the drawings, the wheel of my invention comprises a hub member consisting preferably of a hub 1 having a plurality of spokes 2 integral therewith, each of the said spokes being preferably hollow and equipped at its outer end with a transversely perforated forked portion 3. Pivotally mounted upon a bolt 4 passing through each of said forks 3 is a cushion carrier 5, the said cushion carrier being preferably segmental in shape and equipped upon its outer face with a plurality of pairs of opposed clencher formations 5', each of said clencher formations being adapted to receive the base 6 of a cushioning member. Each of said cushioning members preferably comprises a plurality of legs or teeth 7 extending substantially radially of the wheel outwardly direct from the base 6 and secured integrally to the latter. The radially outward ends of the several toothed or leg portions 7 of the cushioning members are preferably disposed substantially in a cylindrical surface having the axis of the wheel at its center, whereby the said surfaces are adapted to bear with uniform pressure against the inner edge of the cylindrical rim 8 of the tire member of the wheel when there is no strain upon the wheel.

The rim member of the wheel preferably comprises a cylindrical rim 8 having at each of its lateral edges annular side portions 9 and 18 extending respectively inwardly and outwardly of the cylindrical portion 8 in a plane at right angles to the axis of the wheel, the outwardly extending portions of the said flanges 9 being adapted to receive a plurality of tread blocks 10 therebetween. The tread blocks 10 may be of wood or any other semi-resilient material, and are preferably secured in position by being driven radially inward against metal wedges 11 positioned upon the outer surface of the cylindrical rim portion 8, which rim may also be equipped with outwardly directed annular formations 12 adapted to divide the tread-carrying portion of the wheel into a plurality of annular formations. Projecting radially inward from the cylindrical rim portion 8, and normally preferably midway between the radial axes of the spokes 2, are webs 13, which webs divide the annular space bounded by the cylindrical portion 8 and the inwardly directed portions of the flanges 9 into a series of chambers or compartments. Each of the said compartments is open radially inward and is circumferentially substantially equal in length to the radially outward or pediferous portion of the cushioning member carried by the spoke opposite the said chamber or compartment.

In assembling the wheel of my invention, I preferably equip the rim portion thereof with the tread blocks and then insert the pivoted rocking members 5 into the respective chambers or compartments with the outer ends of the cushion portion 7 bearing against the inner face of the cylindrical rim portion 8, this being preferably done with the rim lying flat upon the ground. I then slide the hub member of the wheel within the said rim member with the spokes displaced from their normal relative position by about half as great an angle as that between the spokes, as shown by dotted lines in Fig. —1—, whereupon I rotate the hub member of the wheel to the position shown in full lines in Fig. —1— and insert the bolts 4 through the forked ends 3 of the spokes and the pivotal lug 14 of the base of the rocking member. To avoid a relative circumferential motion of the ends of the spokes when the wheel is under strains, I preferably connect these ends by a pair of stiffening rings 15 secured to the ends of the spokes by the bolts 4 and which rings have flanges 17 slidingly engaging the outer surface of the inward rim flange 9, so that the latter will slide between the adjacent flange 17 and the adjacent edge of the cushion carrier 5. I also preferably interpose a pair of bushings 16 between the prongs of each fork 3 and the lug portion 14 of the rocking member pivoted to the said fork, so as to prevent a tightening of the bolt 4 passing through the said fork from clamping the prongs of the fork tightly against the perforated portion of the rocking member. Consequently, the rocking member will be free to move pivotally about the bolt 4 so as to tilt the base of the cushion carried by the said member with respect to the cylindrical rim portion 8 of the tire member of the wheel.

It will be evident from Fig. —1— that when the wheel is in motion the tire member thereof will tend to lag behind the hub member and the cushioning member carried by the latter, and also that the forked end of the spoke may move radially relative to the adjacent portion of the rim member, thereby distorting and compressing the cushioning member, as shown in Fig. —4—. In doing so, the transverse passages which subdivide the outer portion of the cushioning member into a number of legs will permit an independent compressing of various portions thereof, while the portions of the cushioning members projecting circumferentially beyond the ends of the base 5 carrying the same will bear against the webs 13, thereby tending to restrict the relative circumferential motion of the hub member of the wheel with respect to the tire member thereof. It will also be evident, that in cases of unusually severe strains one end of the said base may engage the adjacent web 13 to effectively stop any further circumferential displacement while the portion of the cushion at the other end of the rocking member may be momentarily entirely out of contact with the web 13 adjacent thereto, as shown in Fig. —4—.

Consequently, the engagement of the end of the base of the rocking member with the adjacent web 13 will relieve the cushioning member of strains due to a tendency toward an excessive relative circumferential motion of the hub and rim members of the wheel, while the pediferous formation of the cushioning member will enable the latter to adapt itself more readily to the varying strains when this cushioning member is at different points of rotation of the wheel than could be done if the cushioning members were not equipped with the transverse channel formations in its circumferentially outer portion. However, I do not wish to be limited to the use of a pediferous cushioning member, nor to other details of the construction herein disclosed, as the same might be varied in many ways without departing from the spirit of my invention.

For example, instead of equipping each spoke with a forked end, I may provide a forked trunnion formation 19 upon the base of the rocking member, as shown in Fig. —3—, in which case the spoke may be provided with a single end lug 20, while a tight clamping of the fork of the rocking member upon the said spoke end may be avoided by spacer bushings 21 positioned upon opposite sides of the said spoke end. To guard against an outward flexing of the radially inwardly directed portions 9 of the lateral rim flanges, which flanges have sliding engagement with the outer edges of the base portion of the rocking member, I preferably equip this portion of the flanges with lugs 22 extending radially inward from the respective flanges and connected by transverse bolts 23, each of said bolts having a spacer tube 24 housing the shank of the bolt intermediate of the respective side flanges.

To simplify the construction, the stiffening rings 15 may be quite simple annular members, as in Figs. 3 and 6. However, I preferably equip them with flanges 17 overhanging the rim flanges 9, as by doing so the said annular members prevent mud or dirt from readily entering the interior of the rim member, since the portions 25 intermediate of the portions 15 and 17 of the said members will tend to catch such mud or dirt and will guard the cushion carriers 5 and the surfaces with which they contact from such grit.

I claim:

1. A vehicle wheel comprising a hub member carrying a plurality of spokes; a rim member radially and circumferentially movable with respect to the hub member, the said rim member having side flanges extending radially inward therefrom, and having radially disposed partitions extending transversely to the said side flanges whereby the annular chamber bounded by the rim and the side flanges is divided into a plurality of pocket formations; and a plurality of rocking members interposed between the said rim and hub members, each of said rocking members comprising a support pivotally secured to one of the spokes of the hub member, and a circumferentially expansible cushioning member having radially outward engagement with the rim of the rim member and having its respective ends adapted to bear against the opposed sides of consecutive partitions.

2. A vehicle wheel comprising a hub member carrying a plurality of spokes; a rim member radially and circumferentially movable with respect to the hub member, the said rim member having side flanges extending radially inward therefrom, and having radially disposed partitions extending transversely to the said side flanges whereby the annular chamber bounded by the rim and the side flanges is divided into a plurality of pocket formations; and a plurality of rocking members interposed between the said rim and hub members, each of said rocking members comprising a support pivotally secured to one of the spokes of the hub member, and a plurality of cushioning members carried by the said support and extending substantially radially therefrom, each of the said cushioning members having engagement at its radially outward end with the inner face of the rim of the said rim member, the spacing between the said cushioning members circumferentially of the wheel permitting a circumferential expansion of the said cushioning members when compressed radially of the rim.

3. A vehicle wheel comprising a hub member carrying a plurality of spokes; a rim member radially and circumferentially movable with respect to the hub member, the said rim member having side flanges extending radially inward therefrom, and having radially disposed partitions extending transversely to the said side flanges whereby the annular chamber bounded by the rim and the side flanges is divided into a plurality of pocket formations; and a plurality of rocking members interposed between the said rim and hub members, each of said rocking members comprising a support pivotally secured to one of the spokes of the hub member and having its lateral edges in slidable engagement with the side flanges of the rim member, and a cushioning member carried by the said support and radially yieldingly supporting the rim member.

4. A vehicle wheel comprising a hub member equipped with a plurality of spokes rigid with the hub-member; a rim member radially and circumferentially movable with respect to the hub member, the said rim member having side flanges disposed substantially at right angles to the axis of the wheel; an intermediate member mounted upon each of the said spokes and slidingly engaging the inner surface of the said side flanges; a cushioning member carried by each of the said intermediate members and interposed between the latter and the said rim member; and annular guards carried by the spokes and preventing the entrance of grit between the side flanges of said rim member and said intermediate member.

In testimony whereof I have signed my name in presence of two subscribing witnesses.

FRANKLIN A. FROMMANN.

Witnesses:
 ALBERT SCHEIBLE,
 M. M. BOYLE.

Copies of this patent may be obtained for five cents each, by addressing the "Commissioner of Patents, Washington, D. C."